United States Patent
Bates et al.

(10) Patent No.: US 8,325,904 B2
(45) Date of Patent: Dec. 4, 2012

(54) SYSTEM AND METHOD FOR FACILITATING PRIVACY IN DIRECTORY ASSISTANCE COMMUNICATIONS

(75) Inventors: Michael Bates, Worthington, OH (US); Alan Sunners, Coopersburg, PA (US); Faith McGary, Bethlehem, PA (US); Christine Baumeister, Schwenksville, PA (US); Harold Robinson, East Stroudsburg, PA (US); Xavier Riley, Center Valley, PA (US)

(73) Assignee: Grape Technology Group, Inc., Bethlehem, PA (US)

( * ) Notice: Subject to any disclaimer, the term of this patent is extended or adjusted under 35 U.S.C. 154(b) by 983 days.

(21) Appl. No.: 12/228,672

(22) Filed: Aug. 14, 2008

(65) Prior Publication Data
US 2009/0080636 A1 Mar. 26, 2009

Related U.S. Application Data

(60) Provisional application No. 60/965,337, filed on Aug. 17, 2007, provisional application No. 61/066,173, filed on Feb. 15, 2008.

(51) Int. Cl.
*H04M 3/493* (2006.01)
*G06F 17/30* (2006.01)

(52) U.S. Cl. .............. 379/218.01; 455/414.1; 707/705

(58) Field of Classification Search ............. 379/218.01; 455/414.1, 422.1; 707/705
See application file for complete search history.

(56) References Cited

U.S. PATENT DOCUMENTS

| 4,979,206 A * | 12/1990 | Padden et al. ............... 379/88.01 |
| 7,184,754 B1 | 2/2007 | Farmar ........................ 455/414.1 |
| 2002/0068550 A1 * | 6/2002 | Tejada ............................ 455/414 |
| 2004/0022382 A1 * | 2/2004 | Sweeney et al. ......... 379/218.01 |
| 2004/0203713 A1 | 10/2004 | Strunk ........................ 455/422.1 |

* cited by examiner

*Primary Examiner* — Harry Hong
(74) *Attorney, Agent, or Firm* — Sofer & Haroun, LLP

(57) ABSTRACT

A method for providing directory assistance, including receiving at least one request from a requester for an un-listed contact information, where the un-listed contact information is stored in one of a plurality of carrier databases. A request is generated to a third party for the un-listed contact information, where the third party is in contact with the carriers, one of which has the un-listed contact information. A notification is received from the third party indicating that the un-listed contact information has been retrieved by said third party and a message is sent to the un-listed contact information, through the third party, indicating that the requester is trying to contact them.

20 Claims, 2 Drawing Sheets

SYSTEM AND METHOD FOR FACILITATING PRIVACY IN DIRECTORY ASSISTANCE COMMUNICATIONS

This application claims the benefit of priority from U.S. Provisional Patent Application No. 60/965,337, filed on Aug. 17, 2007 and U.S. Provisional Patent Application No. 61/066, 173, filed on Feb. 15, 2008, the entirety of which are incorporated herein by reference.

FIELD OF THE INVENTION

The present invention is in the field of directory assistance. More particularly the present invention is in the field of communication messages sent through a directory assistance system for maintaining the privacy of the requested party.

BACKGROUND

In the field of Directory Assistance, typical land line listings are widely available for call completion between a calling party and a requested listing. However, in the field of wireless listings, due to privacy concerns, wireless contact information, such as wireless/cellular numbers, are not freely distributed to directory assistance systems. This privacy concern is of particular concern because of the current fee/billing structures where cellular/wireless users are charged for airtime regardless of whether they initiate or receive the call.

This leaves a large gap in the ability of directory assistance systems to connect callers with potential desired parties/listings, especially in view of the growing number and preference to use wireless numbers as a primary contact information.

OBJECTS AND SUMMARY

The present invention looks to overcome the drawbacks associated with the prior art and to provide a system and method for allowing a caller to send a message to desired party without the need for the wireless carrier of the desired party to release full directories of their wireless contact information.

It is one object of the present invention to provide a system and a method to maintain telecommunication databases in communication networks and dialing systems to increase the performance in parallel with a consortium process and apparatus.

Another object of the present invention is to simplify the private personal name directories in telecommunication networks or name dialing systems by offering connection service via multi-modality methods between requesting parties, and parties that are unlisted, or are in the "do not call" categories through a Consortium process and apparatus.

To this end, the present invention provides a method for providing directory assistance, including receiving at least one request from a requester for an un-listed contact information, where the un-listed contact information is stored in one of a plurality of carrier databases. A request is generated to a third party for the un-listed contact information, where the third party is in contact with the carriers, one of which has the un-listed contact information. A notification is received from the third party indicating that the un-listed contact information has been retrieved by said third party and a message is sent to the un-listed contact information, through the third party, indicating that the requester is trying to contact them.

BRIEF DESCRIPTION OF THE DRAWINGS

The present invention can be best understood through the following description and accompanying drawings, wherein.

DETAILED DESCRIPTION

Figure 1:
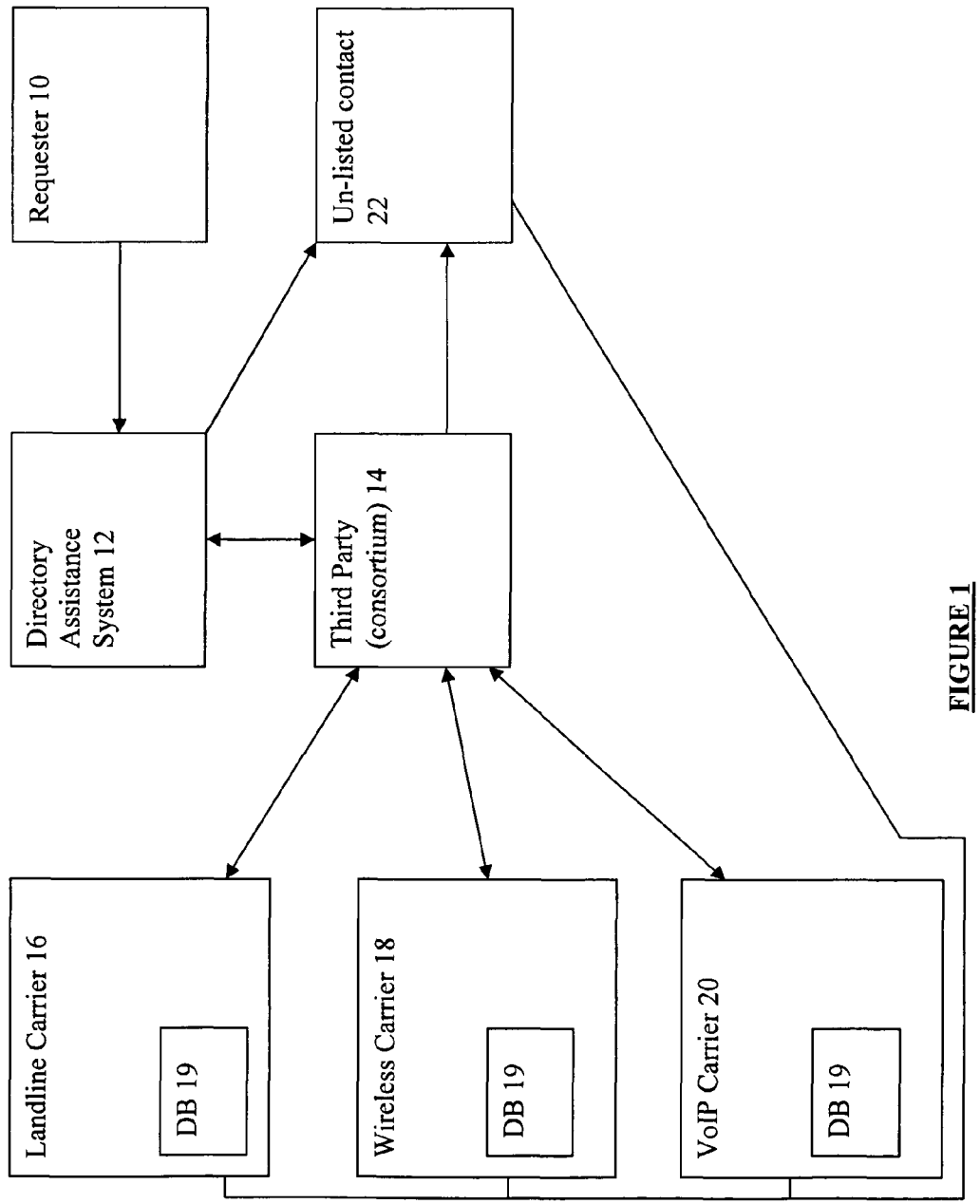
FIG. 1 illustrates a directory assistance system, in accordance with one embodiment of the present invention.

To this end, as illustrated in FIG. 1, a directory assistance system 12 is provided for receiving an incoming call from a calling party A (caller/requester 10) requesting connection to a desired party B (desired requested party 22). If the desired party 22 is a listed number then directory assistance system 12 may simply connect caller 10 to the desired party 22 according to normal directory assistance procedures.

However, in accordance with one embodiment of the invention, if caller 10 is seeking an unlisted, masked, or otherwise unavailable number such as a mobile/cellular telephone number of desired party 22 then the following system and method may be employed to allow caller 10 to have a message sent to the desired party 22 informing them that there is a party desiring to contact them.

It is understood that although the following exemplary discussions refer to a caller 10 seeking a contact wireless telephone number of a desired party 22, it is understood that any unlisted wireless contact information may be connected to in the following manner. Such wireless contact information for desired party 22 may include a telephone number, a short code, VoIP number or screen name, eMail address, speech to text via fax, or text to text via fax, or vanity screen names, landline, instant messaging screen names, or a web address.

FIG. 1 illustrates a system for maintaining mobile privacy in accordance with one embodiment of the invention. A calling party 10, employs a communication device, such as a mobile device or a PDA or a computer to communicate with one or more directory assistance platforms 12. In accordance with one embodiment of the invention, calling party 10 generates a request for a desired listing of a called party 22. One or more directory assistance platforms 12 are coupled to a centralized consortium 14, which is configured to act as a clearing house for generating requests for directory listings and arrange for messages to be transmitted to called parties 22 to notify the called parties B that a requester is attempting to contact them.

In accordance with one embodiment of the invention, consortium 14 is coupled to a plurality of various landline carriers 16, mobile carriers 18 and VOIP carriers 20. Each of these carriers provide telecommunication services to a plurality of their customers, and maintain a database of listing information of each of their customers. However, due to privacy concerns, specifically with respect to mobile and VOIP customers, these carriers are reluctant to provide any listing information to third party requestors in fear of privacy breaches.

According to one embodiment, when caller 10 contacts directory assistance platform 12 seeking an unlisted/mobile telephone number for desired party 22, directory assistance platform 12 directs the call or the request to consortium 14. Consortium 14, after receiving the listing requests generates a "ping" or short communication signal which includes information necessary to search for the desired listing such as name, address, etc. . . . . The ping should have an embedded code that allows any response to be matched to the outgoing ping. The coding may advantageously be or include a universal code that is common to a particular call so that not only the ping and response may be matched to one another, but that such data may be easily associated with the correct call flow between directory assistance platform 12 and caller 10.

The ping generated by consortium 12 is sent to all connected carriers 16, 18 and 20 that may possibly be a carrier for the desired party 22, including but not limited to landline carriers, mobile carriers and VoIP carriers.

Each of the various carriers 16, 18 and 20 checks for available listings that match the data provided in the ping request from consortium 12. A response from the carrier(s) is then sent back to consortium 14 which may simply be a "yes"/"no" response or may include some additional information, such as "yes, name XXXX, at address YYYYY, and contact information ###." This information is then fully or partially forwarded to the directory assistance system 12, with the provision that if the contact number is sent to consortium 14 with the carrier response, that contact number is not further transmitted to the directory assistance system 12.

For example, the responses from the various carriers 16, 18 and 20 are sent to consortium 14. Directory Assistance system 12 may then have partial access, particularly to the knowledge of an existing listing for called party 22 without having the connection information. This allows directory assistance system 12 to notify caller 10 that a listing has been found while simultaneously allowing carriers 16, 18 and 20 do not need to divulge wireless contact information directly to directory assistance platform 12.

Thus, in such an arrangement, directory assistance system 12 is able to conduct a search for a desired listing 22, without the need for ever receiving a complete contact information (including the contact number).

Rather than connecting caller 10 to desired party 22, in the present arrangement, if consortium 14 notifies directory assistance platform 12 that a desired party 22 contact is available, rather than connect them, the present invention contemplates that directory assistance system 12 will send a message to desired party 22, via consortium 14 (that has the appropriate contact information) along with a message that caller 10 is trying to reach them. This message would include at least some form of contact information of caller 10.

This allows the carriers 16, 18 and 20 to retain control over their contact information for wireless and other non-wireless contact information which their customer (desired party 22) may wish to keep private. Furthermore, with the connection to consortium 14, a message may be sent to the desired party 22 by caller 10 through directory assistance system 12 and consortium 14 as discussed in detail below.

In one arrangement, if no responses to the ping are received, consortium 14 relays such information to directory assistance system 12 to let caller 10 know that there were no responses to their query. Optionally, a second query with more information may be processed if desired.

In a second arrangement if only one response is received to the ping, such as from a single mobile carrier, then consortium 14 relays this information to directory assistance system 12 and temporarily stores that ping response. Calling party 10 is then provided with the ability to send a text message or have a text message sent in any other form of electronic or voice message to the desired party 22, according to the process discussed below.

In a third arrangement, if multiple response are received from the carriers, such as multiple responses from one carrier or responses from several carriers, then consortium 14 notifies directory assistance system 12 of the situation and temporarily stores the listings until they receive further instructions. Directory assistance system 12 may ask caller 10 for additional information in order to narrow the search field, or alternatively, if the responses includes the address associated with the contact information then directory assistance system 12 may provide some options to caller 10, by address, or other types of identifying information, to allow them to select one listing option among the results list.

In accordance with various embodiments of the invention, the communication between caller 10 and directory assistance system 12 may be conducted by voice or by text or both. For instance caller 10 may send its request for a listing via a text message, or may request a listing by voice. Similarly, directory assistance system 12 may be automated and receive the text or voice requests via automated systems or via live customer service representatives.

In accordance with one embodiment of the invention, caller 10 may have a preference for the language to communicate with directory assistance system 12. In that event, directory assistance system 12 may provide an opportunity for caller 10 to indicate the preferred language. Furthermore, the preferred language can be stored in association with the caller's MIN or ANI numbers so that the next time caller 10 calls to request a listing, the preferred language is communicated.

The response to caller 10 may also be in text or voice format or both. For example in accordance with one embodiment of the invention, if more than one listing for a desired name is found, a text message with few options to caller 10 is sent. For instance, directory assistance system 12 sends a text message to caller 10 stating "Your request for John Smith has identified 10 listings in the following city and states. Please tap on any one of the listings so that we can send a message that you desire to contact them." Once caller 10 taps on any one of the desired listings, a communication signal with the appropriate information is sent to directory assistance system 12 indicating the selected listing.

In accordance with another embodiment of the invention, if more than one listing for a desired name is found, a text message with request for additional information to caller 10 is sent. For instance directory assistance system 12 sends a text message to caller 10 stating "Your request for John Smith has identified 10 listings. Please enter any additional information that you may have, such as city, state, employer, school, age so we can further locate your request." Once caller 10 provides additional information, directory assistance system 12 parses the additional information to determine whether the additional information provided by caller 10 matches most closely with the information corresponding to any of the multiple listings found. As stated above, in accordance with various embodiments of the invention, the interaction between caller 10 and directory assistance system 12 is conducted via text, voice or both formats. It is also conducted either as a live session, or via delayed messaging such as SMS. Also, it can be conducted via a live operator or via an automated platform.

Assuming a contact for a desired listing 22 is selected according to one of the above options, a message is then delivered by SMS or some other electronic format to listing 22.

In a first option, as noted above, the response from the carriers to consortium 14 simply includes a "yes" or "no." In such an instance, directory assistance system 12 informs consortium 14 to direct a message to be sent to the carrier who provided the "yes" answer to communicate a text message to desired party 22 that calling Party 10 desires to contact them. The message includes the contact # or other related information of caller A so that the ultimate message sent to listing B must provide at least enough information to allow desired party B to contact calling party A. It is noted that in accordance with another embodiment of the invention, the call completion process for sending a message to called party B is handled directly by consortium 14 or directory assistance system 12 depending on agreements between carriers and depending upon regulatory concerns regarding the protection of privacy of the mobile subscribers.

It is further contemplated that all functions performed by consortium 14 in accordance with another embodiment of the invention are performed by directory assistance system 12. As such, the "ping" operation with each one of the carriers is performed by directory assistance system 12.

It is also contemplated that because the initial response message to the ping only included a "Yes" or "no" answer that consortium 14 instructions to the carrier include the contact information for calling party A, but the remainder of the message must be generated by carrier B such as the complete contact address (for the SMS or other electronic message). In such an arrangement, it is contemplated that the ping and response message coding, and subsequent instruction from consortium 14 to send a message to desired party 22 include sufficient tracking information to insure that all legs of this communication flow are properly connected with one another for call flow, billing and tracking purposes. It is further contemplated that the message content, such as the contact information for calling party A may be automatically generated by directory assistance system 12 or consortium 14 using the incoming call information (ANI (Automatic Number Identifier) or MIN (Mobile Identification Number)) of caller A or it may be directed, dictated or augmented, verbally or electronically, by caller 10.

In a second option, as noted above, where the response from the carriers to consortium 14 simply includes a "yes" or "no" in addition to the contact information, directory assistance system 12 may inform consortium 14 to simply create the message, which can be pre-formatted, to be sent directly to the desired party 22 that calling Party 10 desires to contact them.

As with the previous option, the message includes the contact number or other related information of caller 10 so that the message sent to listing 22 must provide at least enough information to allow desired party 22 to contact calling party 10.

Also, as with the above message options, it is contemplated that the message content, such as the contact information for calling party 10 may be automatically generated by directory assistance system 12 or consortium 14 using the incoming call information (ANI (Automatic Number Identifier) or MIN (Mobile Identification Number)) of caller 10 or it may be directed, dictated or augmented, verbally or electronically, by caller 10.

In one embodiment of the present invention, the message sent to desired party 22 may be done in electronic format including but not limited to VoIP, SMS, MMS, voice, eMail, fax, click to call, instant messaging, short codes, vanity screen names for VoIP and instant messaging, and other wireless options. Presumably, the manner for sending the notification message to party 22 is defaulted to SMS unless party 22 has specified some other preferred format for receiving incoming communications.

In another embodiment of the invention, once a message is sent to desired party 22 according to the above operation the electronic message may include, in addition to the information about calling party 10, an option to have their number either retained by consortium 14 or even forwarded to directory assistance system 12 allowing for further callers 10 to be able to contact them directly without the need for the notification message as described above. This option converts the status of the listing from a private undisclosable one to an accessible listing, such as those available currently from landline databases. For example, a business cellular user that is contacted in the above manner as a party 22, may select this option because there is a lesser desire on business parties to have their wireless numbers unavailable for connection through directory assistance.

In accordance with one embodiment, party B may be awarded an incentive such as a free directory assistance calling for a period of time in return for authorizing their information to be listed with the directory assistance system and/or the consortium.

In another embodiment, the ping response to consortium 14 may generate statistics including the number of calls made to specific contact information 22 during a predetermined interval. By generating statistics of how often certain contact information is contacted, the present invention may decide on whether the contact information should be offered to the user to be added to the user's personal directory. The carrier, informed of such statistics may offer to push the person requesting contacts details to their personal address books.

It is noted that, unless otherwise instructed, consortium 14 only stores the contact information/ping response for a brief period of time.

In another embodiment of the present invention, the message to desired party 22 may further include an option, provided by the carrier for example, to open a communication/call completion to requesting party 10, allow connection through CHAT, click a direct link to complete a call, send communication channels via eMail, or through an automobile telematics system, sort codes, fax, instant messaging, connect through a VoIP provider, or click to call connections, with the requester 10 through a random generated, one time use key.

Figure 2:
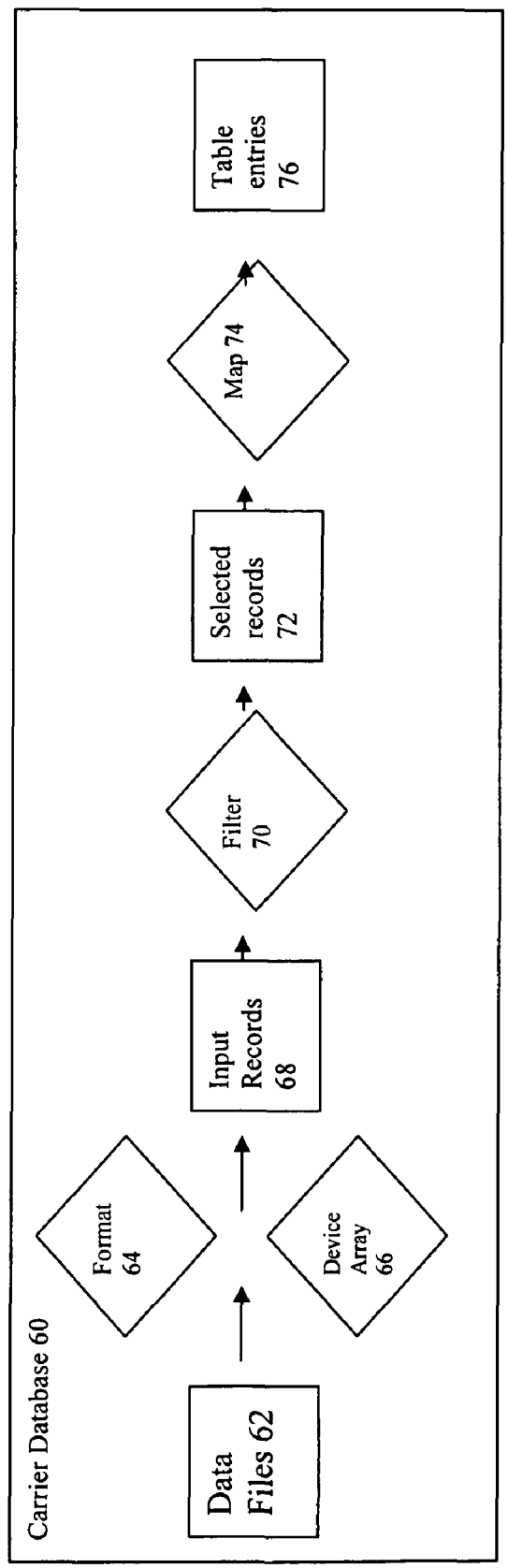
FIG. 2 illustrates a flow diagram regarding table entries for the directory assistance system of FIG. 1, in accordance with one embodiment of the present invention.

The operation of implementing an appropriate database by carriers 16, 18 and 20, for use by consortium 14 or directory assistance 12 is explained in more detail in reference with FIG. 2.

In general each of the carriers that a called party 22 is subscribed to, include various information pertaining to called party 22 in their databases 19. This information may include one or more of the following items depicted in Table 1 below:

TABLE 1
---
Holder Name—name of the person who is primarily going to be carrying the phone
Holder Home Address—house number, street, city, state, post code
Holder's age—is the holder a minor?
Cell Phone number
Billing Name—of the person or entity paying the bills on the phone (only if different)
Billing Address—number, road/street/route, city, state, post code (only if different)
Billing Name Category if entity—category of the business that owns the phone (only if business)
Billing phone number—landline and/or other cell phone number (please note which it is) (only if different)
Relationship of Billing Name to Holder Name—employee, owner of business, relative (son/daughter, mother father, brother, sister etc)
Holder's Employer—if employee, then this may be a good way of uniquely identifying that person in the event there are many with same names
Holder's Location of employment—office address
Holder's highest level of schooling achieved and school and degree - (may help in identifying people with common names?)
(Some other "identifying" information to help the operator find the proper party?)
Holder's Email address (if one exists)
Holder's updated information—mobile carrier required to verify and update information where there is consumer "account activity" or at least every three years

TABLE 1-continued

Required, but not from cell phone owner:

Date of update—in other words, the date when the information is added to the database by the service provider or carrier so that you would know the date the data was provided"

All or some of the above information maintained by each of the carriers can be available to consortium 14 or directory assistance 12 by a data load process as is known by those skilled in the art. In accordance with one embodiment of the invention, the data load process provides a separate table entry that allows consortium 14 or directory assistance system 12 get access to a requested listing once one or more possible listings are identified and retrieved.

The data load process reads a source data file 62, maintained by a carrier such as 16, 18 or 20 and converts the data to a different format to store in a temporary location 64 and inserts the converted data into a database table 76.

During conversion, the source data is often manipulated so that the converted data displays different characteristics. Examples of this manipulation including loading default values, loading certain table columns, or replacing nulls and masking the data to include only part of a value such as portion digits of a cell number.

During operation when a data load process begins its functions, device array 66 finds the set of the source-data files for converting the information into table entries 76 and transfers the data into an input record 68. The category of information requested, such as those defined in table 1 are then filtered out by filter 70 so that the selected records and information are then stored in selected records 72. Mapping system 74 modifies and reorganizes the data for storage in table entry 76.

When a request for a called party 22 is made, the ping signal sends a search request to table entry 76 which is designed to make such searches suitable by consortium 14 or directory assistance 12.

If the request for a listing retrieves many possible listings from a table entry 76, calling party 10 can be prompted to provide additional information relating to other fields for each entry such as those provided in Table 1 above to limit the retrieved choices to one or few listings for selection by calling party 10.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A method for providing directory assistance by a directory assistance system, said method comprising the steps of:
    receiving at said directory assistance system at least one request from a requester for an un-listed contact information, said un-listed contact information being separately stored in one of a plurality of carrier databases;
    generating a request to a third party for said un-listed contact information, wherein said third party is separate from said directory assistance system and from said plurality of carrier databases, and is in contact with said plurality of carrier databases, one of which has said un-listed contact information, wherein said third party is configured to send a search request to one or more of said plurality of carrier databases to determine which of said plurality of carrier databases has said un-listed contact information;
    receiving a notification from said third party indicating that said un-listed contact information has been located in said carrier databases that has said un-listed contact information by said third party; and
    sending a message to said un-listed contact information, through said third party, indicating that said requester is trying to contact them and including contact data of said requester sufficient for a user of said un-listed contact information to contact said requester.

2. The method as claimed in claim 1, wherein said third party is a consortium coupled to said plurality of carrier databases.

3. The method as claimed in claim 1, wherein said request from said requester is in either one of a voice or text format.

4. The method as claimed in claim 1, wherein said message to said un-listed contact information in sent in either one of a voice or text format.

5. The method as claimed in claim 1, wherein said message to said un-listed contact information is a pre-formatted message including contact information of said requester.

6. The method as claimed in claim 1, wherein the step of sending said message to said un-listed contact information further comprises the step of allowing the requester to generate their own custom message.

7. The method as claimed in claim 1, wherein if said received notification from said third party indicating that said un-listed contact information has been retrieved includes more than one un-listed contact information, said method further comprising the step of requesting additional information from said requester regarding said desired un-listed contact information.

8. The method as claimed in claim 1, further comprising the step of presenting an option to an owner of said un-listed contact information allowing said un-listed contact information to be permanently listed with said directory assistance system.

9. The method as claimed in claim 8, wherein said step presenting an option to an owner of said un-listed contact information allowing said un-listed contact information to be permanently listed with said directory assistance system includes the offer of an incentive to said owner of said un-listed contact information.

10. The method as claimed in claim 1, further comprising the step of offering a communication connection option to said un-listed contact information, allowing them to connect with said requester.

11. A method for providing directory assistance by a directory assistance system, said method comprising the steps of:
    receiving at said directory assistance system at least one request from a directory assistance system for an un-listed contact information;
    generating requests to a plurality of carriers, said carriers supporting a plurality of un-listed contact information stored separately from said directory assistance system, wherein said requests are sent to said plurality of carriers to determine which of said plurality of carrier databases has said un-listed contact information;
    receiving a notification from said at least one carrier indicating that said un-listed contact information is handled by said carrier, said notification including at least a portion of said un-listed contact information;
    delivering a message to requester notifying them that the carrier of said un-listed contact information has been located;
    delivering an instruction to said carrier of said un-listed contact information to send a message to a user of said un-listed contact information including at contact data of said requester sufficient for said user of said unlisted contact information to contact said requester.

12. The method as claimed in claim 11, wherein said step of generating a request includes generating a request to a plurality of carriers, each having a plurality of un-listed contact information.

13. The method as claimed in claim 12, wherein said step of receiving a notification includes receiving more than one notification from said carriers.

14. The method as claimed in claim 13, wherein if more than one notification from said carriers, said method further comprising the step of sending a follow up message requesting more information from said directory assistance system.

15. The method as claimed in claim 14, further comprising the step of receiving a responsive communication from said directory assistance system so as to select one un-listed contact among said plurality of retrieved un-listed contact information.

16. The method as claimed in claim 11, wherein said step of receiving from said directory assistance system an instruction to send a message to said un-listed contact information includes a preformatted message including a requester contact information.

17. The method as claimed in claim 11, wherein said step of receiving from said directory assistance system an instruction to send a message to said un-listed contact information includes a customized message from said requester including said requester contact information.

18. The method as claimed in claim 11, wherein said received notifications from said carriers are stored for a predefined period of time and then deleted.

19. The method as claimed in claim 11, wherein said received notifications from said carriers are data files from said carrier in a carrier's standard listing format.

20. The method as claimed in claim 19, wherein said received notifications from said carriers are filtered to include a limited subset of a full listing data of said un-listed contact information.

* * * * *